Patented Oct. 2, 1934

1,975,682

UNITED STATES PATENT OFFICE 1,975,682

PROCESS FOR MANUFACTURING AN EXPLOSIVE SUBSTANCE CONTAINING AMMONIUM NITRATE

Luis Emir d'Asteck Callery, Madrid, Spain, assignor to Nuevos Explosivos Industriales S. A., Madrid, Spain, a corporation of Spain No Drawing. Application January 13, 1933, Serial No. 651,639. In Spain March 23, 1932

3 Claims. (Cl. 52—21)

This invention relates to a method of manufacturing an explosive substance.

The primary object of the present invention relates to a method for obtaining an oxidized product of hexamethylenetetramine and either or both nitric acid and hydrogen peroxide utilizing ammonium nitrate.

A further object of the invention relates to a method of manufacturing a substance for use as an explosive wherein a reaction product of ammonia and formaldehyde is precipitated so as homogeneously to contain ammonium nitrate, said product being oxidized by treatment with nitric acid or hydrogen peroxide.

In carrying the invention into effect, anhydrous ammonia gas is caused to bubble into a cooling tank containing an aqueous solution of 40% formaldehyde and 50% ammonium nitrate plus nitric acid (40% solution) or hydrogen peroxide (30% solution). As soon as a rapid evolution of ammonia gas occurs at the surface of the solution the supply of ammonia is cut off and oxidation is effected by means of the nitric acid or hydrogen peroxide care being taken that the heat of the reaction does not exceed 15° C. When the oxidation has proceeded to the required extent an intense precipitate of crystals is formed on the bottom of the container, said precipitate homogeneously containing ammonium nitrate which is carried down with the precipitate. The liquid is then decanted off and the mass is passed into a centrifuge for drying, whereupon it is ready for use.

The substance so manufactured finds many applications as a so-called "safety" explosive for industrial purposes.

What I claim is:—

1. Method of manufacturing a substance containing ammonium nitrate for use as an explosive, consisting in treating an aqueous solution of 40% formaldehyde and 50% ammonium nitrate plus nitric acid (40% solution) and hydrogen peroxide (30% solution) by bubbling anhydrous ammonia gas into said solution, which solution is contained in a cooling tank, the supply of ammonia gas being discontinued when rapid evolution of this gas occurs at the surface of the solution.

2. Method of manufacturing a substance containing ammonium nitrate for use as an explosive, consisting in treating an aqueous solution of 40% formaldehyde and 50% ammonium nitrate plus hydrogen peroxide (30% solution) by bubbling anhydrous ammonia gas into said solution, which solution is contained in a cooling tank, the supply of ammonia gas being discontinued when rapid evolution of this gas occurs at the surface of the solution.

3. A method of manufacturing a substance for use in explosives, consisting in causing anhydrous ammonia gas to react with formaldehyde solution, and in oxidizing the product of the reaction and ammonim nitrate which is added to the solution with nitric acid and hydrogen peroxide.

LUIS EMIR D'ASTECK CALLERY.